United States Patent
Figge

[19]

[11] Patent Number: 5,910,185
[45] Date of Patent: Jun. 8, 1999

[54] DEVICE FOR THE GUIDANCE OF HOT-ROLLED STRIP THROUGH AN INDUCTOR

[75] Inventor: Dieter Figge, Essen, Germany

[73] Assignee: Mannesmann Aktiengesellschaft, Düsseldorf, Germany

[21] Appl. No.: 08/586,485

[22] Filed: Jan. 16, 1996

[30] Foreign Application Priority Data

Jan. 16, 1995 [DE] Germany .......................... 195 02 071

[51] Int. Cl.$^6$ .................................................. B21B 27/06
[52] U.S. Cl. .............................. 72/202; 72/12.3; 72/227; 72/251; 219/653
[58] Field of Search .............................. 72/202, 245, 226, 72/342.1, 342.94, 342.96, 12.3, 205, 250, 251, 227, 8.6, 11.4; 219/602, 614, 650, 653, 659, 673; 198/602, 782

[56] References Cited

U.S. PATENT DOCUMENTS

| | | | |
|---|---|---|---|
| 4,307,276 | 12/1981 | Kurata et al. ........................... | 219/650 |
| 4,407,438 | 10/1983 | Wiechmann .............................. | 72/250 |
| 4,627,259 | 12/1986 | Andersson et al. ........................ | 72/202 |
| 5,195,344 | 3/1993 | Masuda et al. ........................... | 72/202 |
| 5,333,366 | 8/1994 | Guse ....................................... | 72/202 |
| 5,540,074 | 7/1996 | Smith et al. .............................. | 72/201 |
| 5,550,353 | 8/1996 | Peysakhovich et al. ................. | 219/653 |

FOREIGN PATENT DOCUMENTS

| | | | |
|---|---|---|---|
| 52-26224 | 7/1977 | Japan ...................................... | 72/202 |
| 53-88614 | 8/1978 | Japan ...................................... | 198/782 |
| 62-9704 | 1/1987 | Japan . | |
| 62-267010 | 11/1987 | Japan ...................................... | 72/8.6 |
| 63-126608 | 5/1988 | Japan ...................................... | 72/202 |
| 2303619 | 12/1990 | Japan ...................................... | 72/202 |
| 30-42101 | 5/1991 | Japan . | |
| 4172122 | 6/1992 | Japan ...................................... | 72/202 |

*Primary Examiner*—Joseph J. Hail, III
*Assistant Examiner*—Ed Tolan
*Attorney, Agent, or Firm*—Cohen, Pontani, Lieberman & Pavane

[57] ABSTRACT

An apparatus for guiding hot-rolled strips through an inductor, arranged between two adjacent roll stands, of an induction heating device, in particular within a finishing mill behind a strip-casting installation or thin-slab casting installation. The apparatus guides the strip between the roll stands under controlled tension over at least two guide rollers arranged on both sides of the inductor in a plane of travel of the strip which extends centrally through the inductor space between the induction coils. A tension-measurement roller is provided for regulating the tension of the strip and is arranged in front of the inductor and the first guide roller.

7 Claims, 7 Drawing Sheets

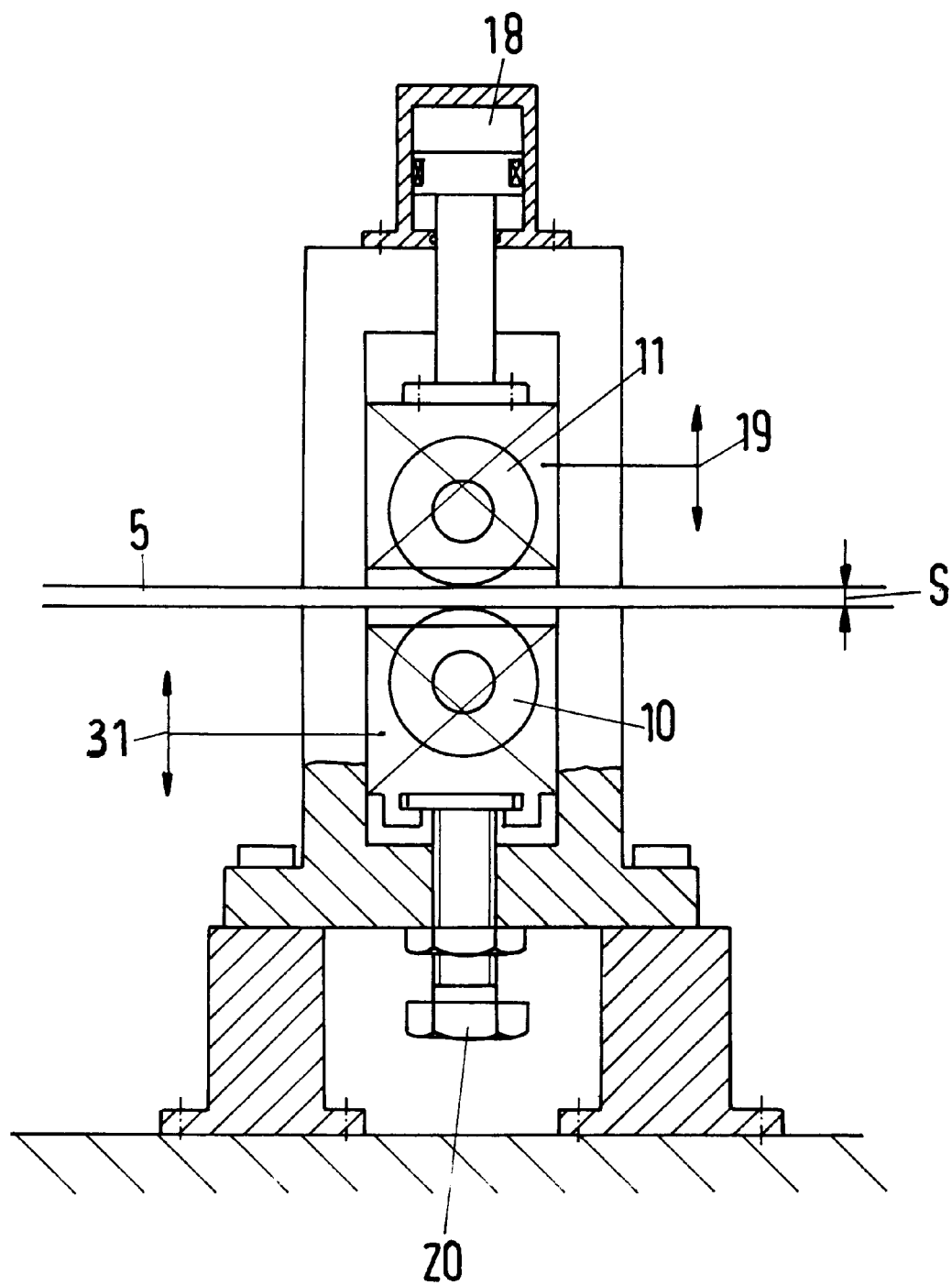

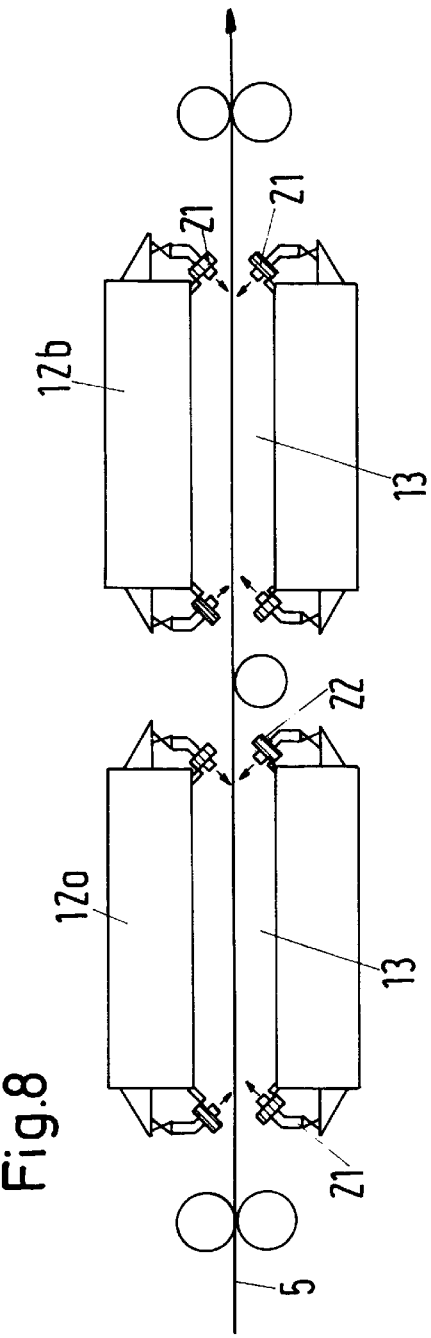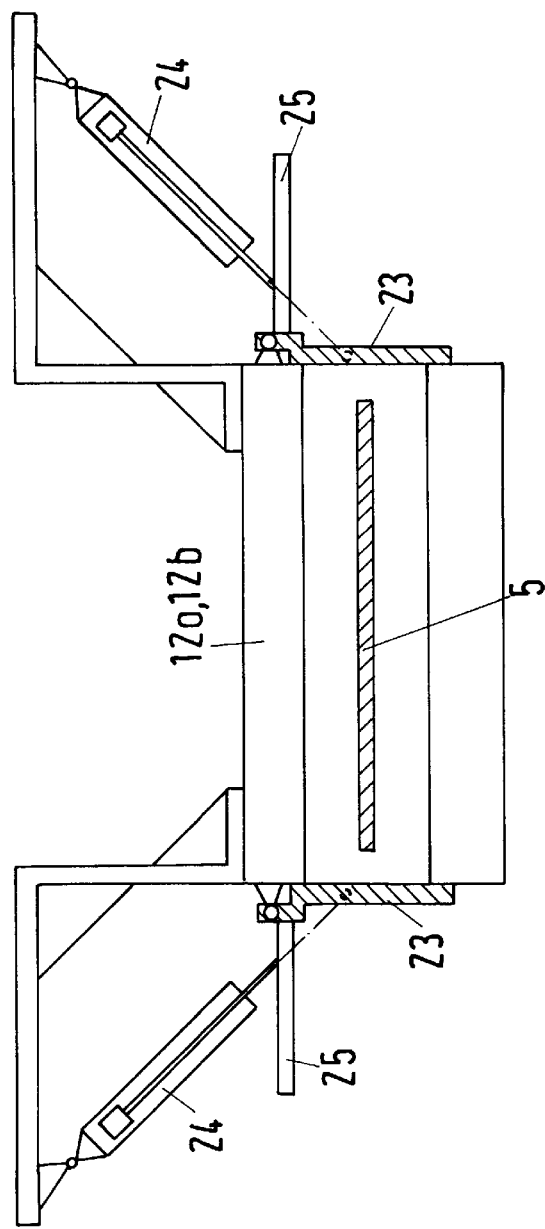

DEVICE FOR THE GUIDANCE OF HOT-ROLLED STRIP THROUGH AN INDUCTOR

BACKGROUND OF THE INVENTION

1. Field of the Invention

The present invention relates to a device for conducting hot-rolled strip through an inductor of an induction heating device arranged between two adjacent roll stands and, in particular, in a finishing mill behind a strip-casting or thin-slab casting plant.

2. Description of the Prior Art

In the finish rolling of hot strips, it is frequently necessary to adjust the temperature of the rolling stock to rolling temperature before the stock is introduced into the roll stand. If the reheating of the rolling stock is effected by induction heating in the break-down mill, it is carried out with large cross sections of the rolling stock and slow rolling speeds. It is also customary to bring the rolling stock to rolling temperature by gas-heated furnaces. The reheating in the finishing mill is effected at higher speeds and requires special measures, since small cross sections must be heated.

Recently, strip-casting methods and thin-slab casting plants have become increasingly important. In this connection, a continuously cast pre-strip is fed directly for further shaping. An endless rolling with the advantage of rolling at a uniform heat is desired. However, problems arise in connection with the guidance of the rolling stock both at start-up and during the rolling. Problems also arise in connection with the adjustments of the rolling speeds within the train of rolls.

European Patent Application 01 62 361, discloses a device for adjusting the tension of the strip in a hot-rolled strip mill, which serves to determine the changing tensions of the strip and to accordingly adjust the speeds of roll stands of the hot-strip rolling mill so as to keep the variations in the tensile forces low.

In order to improve the control of the temperature in the strip, German patent 38 40 812 provides devices for inductive heating, which counteract the cooling of the strip during the rolling, between two adjacent roll stands of a finishing mill, behind a thin-slab casting plant. This is of importance, in particular, when rolling so-called thin slabs since, as a result of the small cast cross sections, the thermal energy stored in the material is frequently not sufficient to maintain the necessary final rolling temperatures. If strip thicknesses of less than 2 mm are to be obtained, a heating of the rolling stock in the region of the finishing-mill is unavoidable. Heating upon the rolling of cross sections from strip-casting plants becomes even more necessary when several stands are required for rolling.

Induction heating devices are well adapted to provide the necessary thermal energy, since they are capable of bringing about uniform temperature changes within a very short time. A uniform temperature is the prerequisite for strip of good quality, and the uniform temperature is to be assured in the strip by the inductor.

For the uniform heating in the inductor, however, a constant distance between induction coil and rolling stock is also a prerequisite. However, this can be obtained only with an undisturbed as possible position of the strip within the inductor, in which connection the top and bottom sides of the strip should be at an equal distance from the coils. In the extreme case, disturbance and fluttering of the strip in the induction space can otherwise lead to non-uniform temperatures or arcing between coil and strip, by which the surface of the strip is damaged.

SUMMARY OF THE INVENTION

Accordingly, it is an object of the present invention to provide a device for the tension-controlled guidance of hot-rolled strip through an inductor arranged between two adjacent roll stands which makes possible an undisturbed position of the strip in the inductor and thus also a uniform heating of the strip.

Pursuant to this object, and others which will become apparent hereafter, one aspect of the present invention resides in a device in which the strip is guided between the roll stands under controlled tension over at least two guide rollers in a plane of travel of the strip which extends centrally through the inductor space between the induction coils. In order to adjust the tension of the strip, a tension-measuring roller which reacts to force is provided in front of the inductor and the first guide roller.

With the inventive device, the problems of regulating the speed of roll stands, guidance of the strip, and inductive heating between two roll stands are simultaneously solved, in that the strip is subjected to a dependable guidance which is made possible by the controlled tension of the strip. While the strip passes, held taut by the tension control, through the inductor space, the guide rollers insure a precise horizontal positioning of the strip within the inductor space.

In one embodiment of the invention, the inductor, is C-shaped, surrounds the top and bottom sides of the strip and is divided in two transverse to the direction of travel of the strip. Another guide roller is arranged in the plane of travel of the strip between the two parts.

The further guide roller within the inductor stabilizes the position of the strip in the inductor space and the C-shaped development of the inductor makes it possible, even when the strip is inserted, to remove the inductor from its region.

In another embodiment of the invention, it is provided the inductor is arranged on a carriage which is movable transverse to the direction of travel of the strip and can be moved out of the region of the strip. Additionally, a roller table is provided which can be moved below the strip simultaneously with the moving out of the inductor. This development is of importance, in particular, for the starting process, during which the starting end of the strip importance, in particular, for the starting process, during which the starting end of the strip cannot yet be guided accurately and smoothly through the inductor. Only after the threading of the starting end of the strip in the second roll stand can the necessary tension be applied for the taut guidance of the strip. In the meantime, the introducible roller table serves to support and guide the strip. The roller table is replaced by the inductor as soon as stable conditions with which the inductor can operate properly prevail.

The inductor and the roller table are preferably arranged on a common carriage so that by transverse movement of the carriage, the roller table and inductor can be alternately brought into the region of the strip.

For even better guidance of the strip within the inductor, in accordance with a further embodiment of the invention, pressing rollers are associated with at least the guide rollers arranged on both sides of the inductor. The pressing roller can be lowered onto the strip from above, which settled the travel of the strip and avoids oscillations which could lift the strip off from the guide rollers. The pressing rollers can be applied pneumatically with regulated force.

Upon a change of the strip thicknesses to be rolled, the slots in the inductor, i.e. the distance between coil and rolling stock, must be readjusted, since the slot on the bottom side and the slot on the top side of the strip must be equal so that the amounts of heat induced and thus the temperatures on the top side and bottom side of the strip are the same. In order not to have to adjust the inductor vertically each time, in an additional embodiment of the invention, the guide rollers are vertically adjustable with respect to the inductor. This is substantially easier than making the inductor also vertically displaceable. Since the pressing rollers can, as it is, be pressed pneumatically under controlled force, it is sufficient to make the lower side rollers adjustable.

In the range of rolling temperatures from 1000 to 1250° C., there is an increased formation of scale on the surface of the strip, particularly if the inductor must heat the strip for a short time to about 1100° C. For this reason, measures should be taken against the formation of scale. In accordance with the invention, the inductor space is flooded with inert gas so as to displace the oxygen which is responsible for the formation of scale.

The present invention combines features to provide a device which maintains the position of the strip within the inductor space absolutely constant despite and because of the adjustment of the tension, so that the strip temperatures can be maintained constant as a result of the constant distances from the inductor coil. With the device of the invention, endless rolling with uniformly good quality is possible and large furnaces are not required. Furthermore, the device in accordance with the invention is not limited to thin-slab plants but can also be used in other hot-rolling installations.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 7 shows one of the guide rollers with a pressing roller;

FIG. 8 is a cross section through the bipartite inductor with inert-gas injection; and FIG. 9 is a section through the inductor in the transverse direction of the strip with closure flaps.

DETAILED DESCRIPTION OF THE PREFERRED EMBODIMENTS

Figure 1:
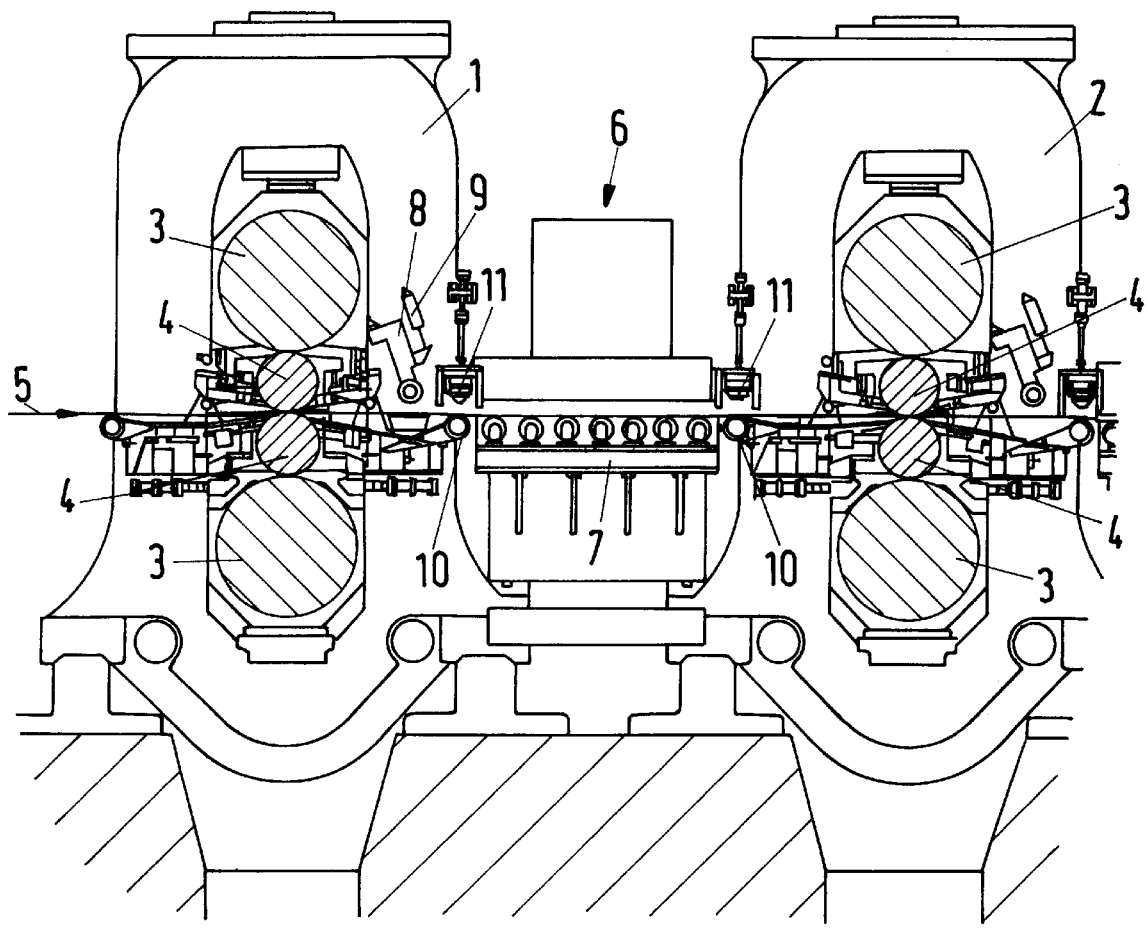
FIG. 1 shows two roll stands with an inductor arranged between them, seen in a starting phase, pursuant to the present invention.

In FIG. 1, the reference numerals 1 and 2 are two of several roll stands of a finishing mill which are arranged behind a thin-slab casting plant. The roll stands 1, 2 are four-high stands with support rolls 3 and working rolls 4, which reduce the strip 5. Between the roll stands 1, 2 there is arranged, in accordance with the invention, an induction heating device 6 which will be described in further detail below. During a starting phase, shown in FIG. 1, i.e. during the introduction of the strip 5 into the working rolls 4 of the roll stand 2, the induction heating device 6 is moved laterally alongside the strip 5, while the strip 5 is guided over a roller table 7 and thereby supported. On the outlet side of the roll stand 1, a tension-measuring roller 8 is provided to be swingable by means of a piston-cylinder unit 9 against the surface of the strip 5 and so that it can be pushed into the strip 5. On both sides of the roller table 7, two guide rollers 10 are arranged below the strip 5. Each of guide rollers 10 is associated on the top of the strip 5 with pressing rollers 11 which will be described below with reference to FIG. 7.

Figure 2:
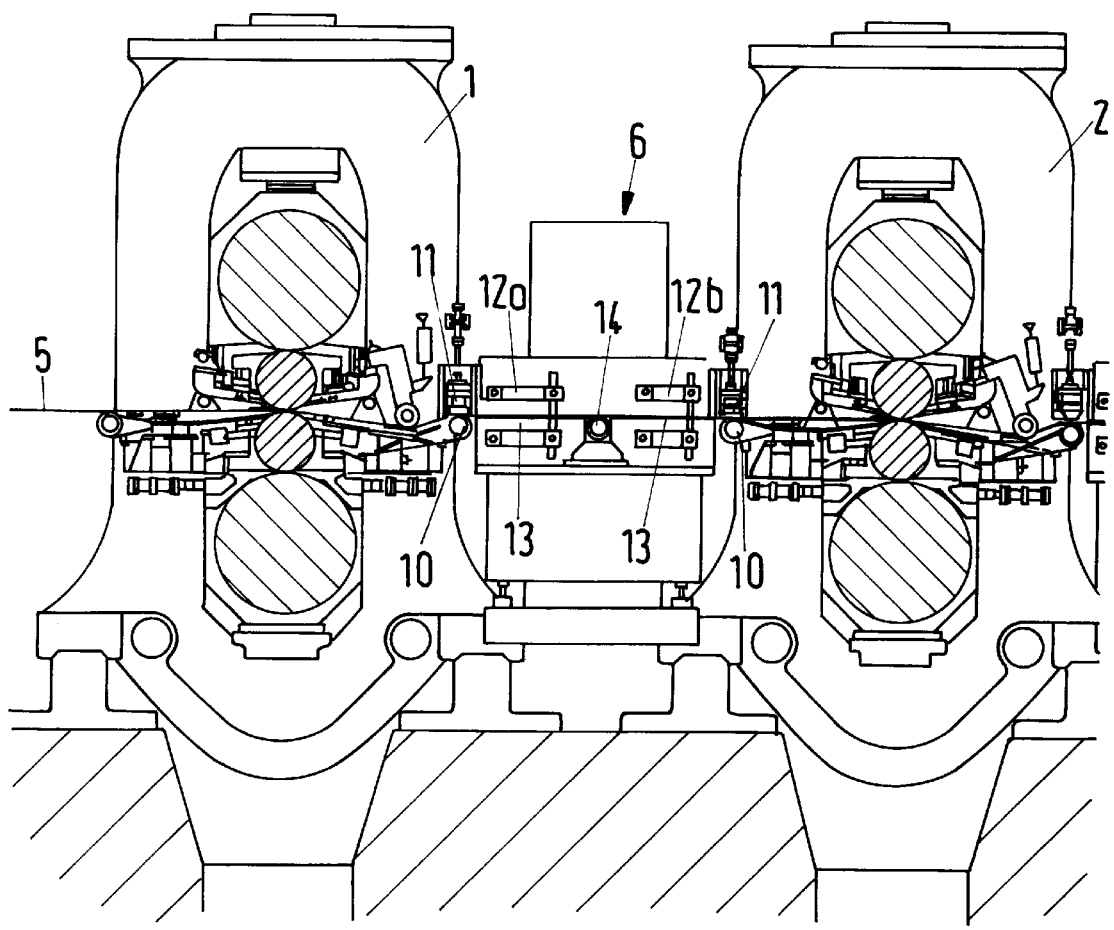
FIG. 2 shows the roll stands of FIG. 1 during rolling.

In FIG. 2, identical parts from FIG. 1 have been provided with the same reference numeral. FIG. 2 shows the rolling phase of the strip 5. The induction heating device 6 is introduced into the rolling line so that a bipartite inductor 12a, 12b is so positioned above and below the strip 5 to heat the strip 5 via the coils of the inductor 12a, 12b. The strip 5 is positioned by the guide rollers 10 so that it extends in a plane in the center of the inductor space 13 formed within the inductor 12a, 12b. An additional guide roller 14 between the two halves of the inductor 12a and 12b further supports the strip 5 and serves to precisely guide the strip 5 within the induction device 6. The pressing rollers 11 of the guide rollers 10 prevent a fluttering of the strip 5 and assure a smooth, quiet travel of the strip 5. The tension-measuring roller 8 is pushed into the strip 5 so that measuring means note the tensile strength of the strip 5 and can adjust the drives of the roll stands 1, 2 so that a uniform tension of the strip 5 is maintained by which the strip 5 is guided accurately through the inductor 12, 12b.

Figure 3:
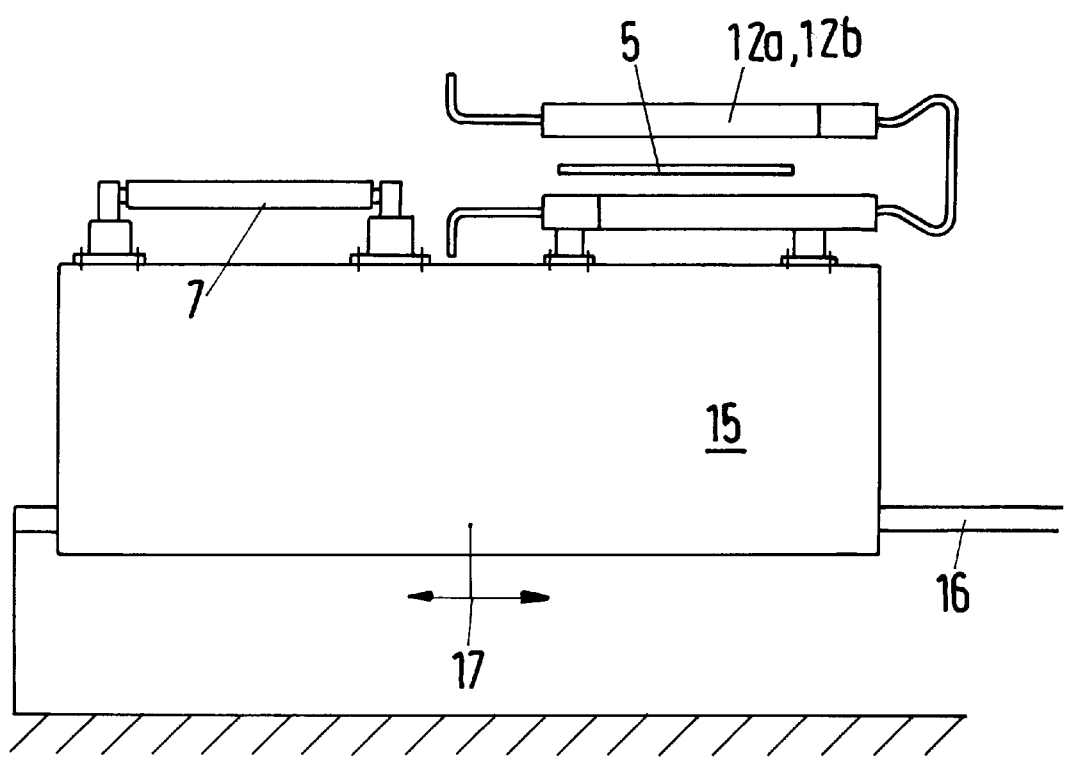
FIG. 3 is a cross section through the carriage bearing the inductor.

As can be noted from FIG. 3, the inductor 12a, 12b is C-shaped in cross section so that the induction coils, which are not shown further, can grip over the top and bottom of the strip 5 and the inductor 12a, 12b can nevertheless be removed from the region of the strip without having to remove the strip 5. For this purpose, the inductor 12a, 12b is arranged on a carriage 15, shown only diagrammatically, which is movable on rails 16 in the direction indicated by the arrow 17. The roller table 7 is also fastened on the carriage 15, so that, upon movement of the carriage 15 to the right (in the plane of the drawing), the inductor 12a, 12b can move out of the region of the strip 5 and, at the same time, the roller table 7 can move below the strip 5. In this position of the carriage 15, the strip 5 can be introduced into the roll stand 2. After the start of the actual rolling process, the carriage 15 can be pushed back to the left (in the plane of the drawing) so that the roller table comes into the position shown in FIG. 3 and the inductor 12a, 12b can surround the strip.

Figure 4:
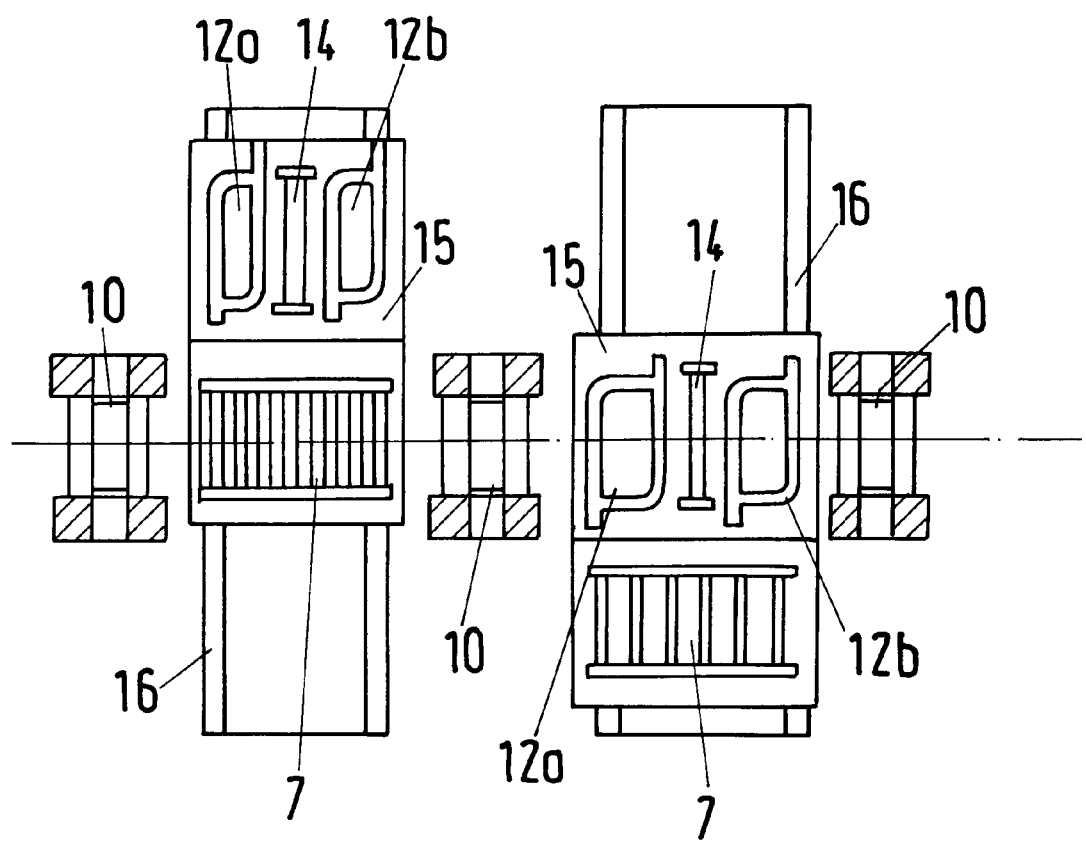
FIG. 4 is a top view of the carriage of FIG. 3.

In FIG. 4, the two displacement positions of the carriage 15 are shown alongside one another. Identical parts bear the same reference numerals.

Figure 5:
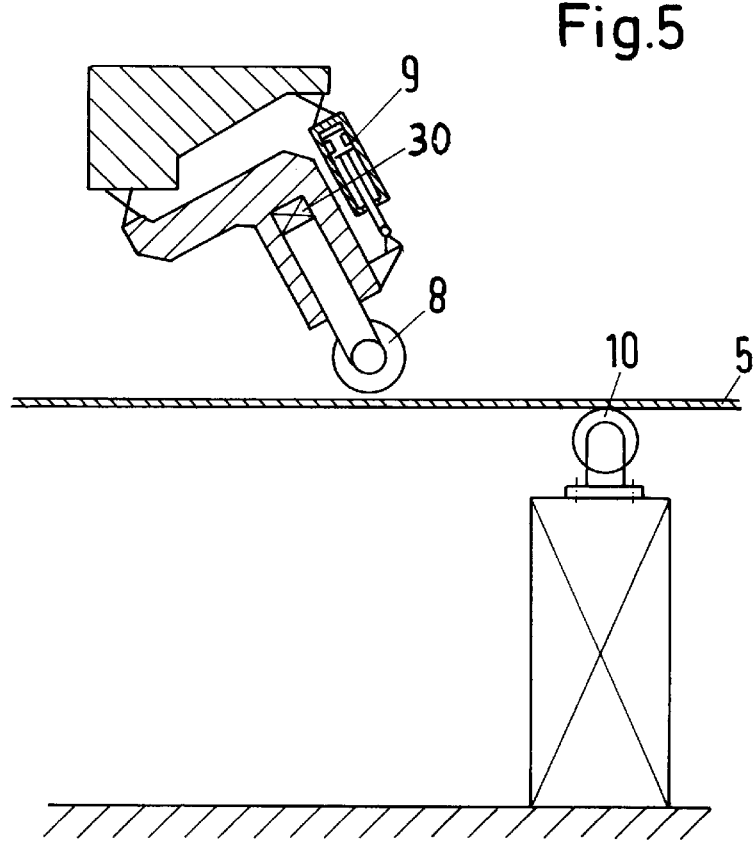
FIG. 5 shows the tension measuring roller in the starting phase.
Figure 6:
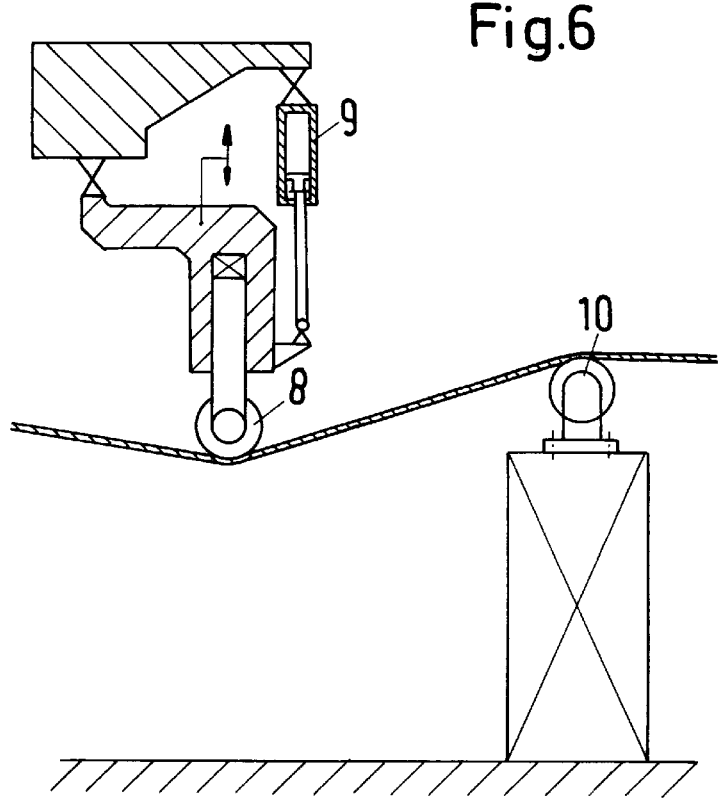
FIG. 6 shows the tension-measuring roller during the rolling process.

FIGS. 5 and 6 show the tension-measuring roller 8 in a simplified, enlarged view. FIG. 5 shows the starting position upon the introduction of the strip, and FIG. 6 shows the position in the rolling phase. The tension-measuring roller 8 is, for instance, a so-called tensio-meter roller which, via a force-measuring unit 30, measures the pressing force of the roller 8 on the strip 5 and, in this way, the tensile forces in the strip 5. A measurement signal is fed for evaluation to a computer which, from the measured values, gives off a signal to control the rolling milling adjustment or rolling mill drive so as to establish the uniform tension in a known manner. The measurement roller 8 is swingable via the piston-cylinder unit 9, as shown in FIGS. 5 and 6. The guide roller 10 arranged in front of the inductor establishes the plane of travel of the strip 5 within the inductor 12a, 12b. As can be seen, this plane is not affected or changed by the tension-measuring device.

FIG. 7 shows an illustrative arrangement of the guide roller 10 which, as indicated by the arrow 31, is adjustable vertically. In this way, the guide roller 10 can be adjusted for different strip thicknesses S so that the plane of travel of the strip can always be directed to the center of the inductor 12a, 12b. Above the guide roller 10, the pressing roller 11 is shown which can be pressed, via a pneumatic cylinder 18, with a predeterminable pressing force against the top of the strip 5 and is adjustable vertically, as indicated at 19. A set screw 20 serves to adjust the guide roller 10.

FIGS. 8 and 9 show, greatly simplified, examples of how the inductor space 13 between the inductors 12a, 12b can be flooded with inert gas. For this purpose, in each case approximately twenty nozzles 21 are arranged over the width of the strip 5, inclined in the direction towards the induction space 13, and inject inert gas into the induction space 13. The nozzles 21 are screened by flaps 22 which reduce the exit cross section between the inductor 12a, 12b and the strip 5. As shown in FIG. 9, the lateral openings of the inductor 12a, 12b can also be closed by flaps 23, which swing, via piston-cylinder units 24, into a position 25 when the inductor is to be moved out of the region of the strip 5.

The manner of operation of the apparatus of the invention will be described next.

After the introduction of the strip 5, i.e. the passage of the strip through the working rolls 4 of the roll stand 1, the transport over the roller table 7, and the introduction through the work rolls 4 of the roll stand 2, the piston-cylinder unit 9 of the tension-measuring device is actuated so that the measurement roller 8 dips onto the strip 5 (FIG. 2), so that the tension of the strip 5 between the roll stands 1, 2 can be adjusted via the measured value. At the same time, the inductor 12a, 12b is moved over the strip 5 by the movement of the carriage 15, the roller table 7 being at the same time moved out of the region of the strip 5. The strip 5 comes to rest on the guide rollers 10, 14 and is held on the guide rollers 10, by the application rollers 11. The strip 5 which is conducted in the center of the induction space 13 can now be uniformly heated by means of the inductor 12a, 12b. Uniform heating of the strip which is guided in defined manner being expected.

The inductor space 13 is flooded (FIGS. 8 and 9) with inert gas, for example nitrogen or argon, in order to displace the oxygen which otherwise would lead to strong scaling of the surface of the strip.

The invention is not limited by the embodiments described above which are presented as examples only but can be modified in various ways within the scope of protection defined by the appended patent claims.

I claim:

1. A device for guiding hot-rolled strip in a travel direction through an inductor arranged between two adjacent roll stands of an induction heating device, comprising:

an inductor having induction coils that define an inductor space, the inductor being C-shaped so as to surround a top and bottom of the strip, the inductor also being divided in two transverse to the travel direction of the strip;

at least two guide rollers arranged on each side of the inductor in a travel plane of the strip which extends centrally through the inductor space between the induction coils, so as to guide the strip between the roll stands under controlled tension in a precise horizontal position within the inductor space so that a uniform heating of an entire cross-section of the strip occurs;

tension-measuring roller means responsive to force and arranged in front of the inductor and a first of the guide rollers for regulating tension of the strip; and an additional guide roller arranged in the travel plane of the strip between the two parts of the inductor.

2. A device according to claim 1, and further comprising a pressing roller associated with each of the guide rollers and arranged above the associated guide roller so as to be lowerable onto the strip.

3. A device according to claim 2, and further comprising means for pneumatically pressing the pressing rollers onto the strip with a controlled force.

4. A device according to claim 2, wherein the guide rollers are provided so as to be vertically adjustable with respect to the inductor, and further comprising means for vertically adjusting the guide rollers.

5. A device according to claim 1, and further comprising means for flooding the inductor space with inert gas.

6. A device for guiding hot-rolled strip in a travel direction through an inductor arranged between two adjacent roll stands of an induction heating device, comprising:

an inductor having induction coils that define an inductor space;

at least two guide rollers arranged on each side of the inductor in a travel plane of the strip which extends centrally through the inductor space between the induction coils, so as to guide the strip between the roll stands under controlled tension in a precise horizontal position within the inductor space so that a uniform heating of an entire cross-section of the strip occurs;

tension-measuring roller means responsive to force and arranged in front of the inductor and a first of the guide rollers for regulating tension of the strip;

a carriage moveable transverse to the travel direction of the strip, the inductor being arranged on the carriage so that it can be moved out of a region of the strip; and a roller table arranged to be moveable below the strip simultaneously with the moving out of the inductor from the strip region.

7. A device according to claim 6, wherein the inductor and the roller table are both arranged on the carriage.

* * * * *